US006321610B1

(12) United States Patent
Sekiguchi

(10) Patent No.: US 6,321,610 B1
(45) Date of Patent: Nov. 27, 2001

(54) VIBRATION APPARATUS FOR A VARIABLE AMPLITUDE TYPE VIBRATION TABLE

(75) Inventor: Yoji Sekiguchi, Maebashi (JP)

(73) Assignee: Kabushiki Kaisha Kei (JP)

( * ) Notice: Subject to any disclaimer, the term of this patent is extended or adjusted under 35 U.S.C. 154(b) by 0 days.

(21) Appl. No.: 09/366,528

(22) Filed: Aug. 8, 1999

(51) Int. Cl.[7] .......... F16H 33/00

(52) U.S. Cl. .......... 74/61; 74/87; 425/456

(58) Field of Search .......... 174/61, 87, 86; 425/456, 421, 432, 424

(56) References Cited

U.S. PATENT DOCUMENTS

| | | | |
|---|---|---|---|
| 5,067,358 | * 11/1991 | Ancrenaz | 74/61 |
| 5,652,002 | * 7/1997 | Kobayashi | 425/432 |

FOREIGN PATENT DOCUMENTS

| | | |
|---|---|---|
| 2-735045 | * 6/1995 | (FR) . |
| 932782 | * 7/1963 | (GB) . |
| 2-80203 | 3/1990 | (JP) . |
| 4-20604 | 1/1992 | (JP) . |
| 9141202 | 6/1997 | (JP) . |

* cited by examiner

*Primary Examiner*—Sherry Estremsky
*Assistant Examiner*—Tisha D. Lewis
(74) *Attorney, Agent, or Firm*—Adams & Wilks

(57) ABSTRACT

A vibration apparatus has a vibration table and pairs of vibration driving shafts and vibration driven shafts having eccentric weights for vibrating the vibration table and disposed symmetrically about a central axis of the vibration table. First and second rotation transmission mechanisms transmit rotation of a respective one of the vibration driving shafts to a respective one of the vibration driven shafts. An interlocking mechanism interconnects the first and second transmission mechanisms to one another and has a connecting rod having a first end connected to a support arm of one of the rotation transmission mechanisms and a second end connected to a support arm of the other rotation transmission mechanism. A driving mechanism drives the connecting rod of the interlocking mechanism to pivot the support arms to thereby vibrate the vibration table. The driving mechanism has a tubular housing and a rod member having an end connected to the first end of the connecting rod and is mounted to the tubular housing for undergoing extension and retraction movement relative the tubular housing so that vertical vibration of the vibration table is varied between a maximum point and a minimum point solely in accordance with an extension length of the rod member relative to the tubular housing.

12 Claims, 5 Drawing Sheets

(A)

(B)

(C)

VIBRATION APPARATUS FOR A VARIABLE AMPLITUDE TYPE VIBRATION TABLE

BACKGROUND OF THE INVENTION

1. A Field of the Invention

The present invention relates, in general, to a vibration apparatuses and more particularly to a vibration apparatus for a variable amplitude type vibration table and which generates vertical vibration for the use of, for example, a concrete block molding machine.

2. Description of Prior Art

Many types of vibration apparatus have been known in the art which have vibration tables, vibration shafts having eccentric weights for vibrating the vibratory table. An example of such vibration apparatsu as described above is a vibration table for a concrete block molding machine which is disclosed in Japanese Patent Publication (unexamined) No. 2-80203 in which a material for concrete blocks is supplied into a mold form and a vibration table is provided for receiving the mold form. At a lower position of the vibration table, two vibration axial bodies of a dual axial structure having weights are provided so that the position of the weights can be directly changed by a hydraulic or an oil pressure device. In this conventional device, the position of the weights is moved or changed by a sliding movement of the hydraulic piston so that an amplitude of the vibratory movement is varied.

However, in the conventional vibration mechanism of a dual-axis structure which has a single axis for serving as an inner cylinder and an outer cylinder, the entire structure of the mechanism is so complex that it is quite difficult to provide unbalanced positions of vibration by means of a phase difference and to control or regulate the position of the weights. Thus, it has been difficult to incorporate and assemble the vibration mechanism into the apparatus, and substantial labor is required to maintain of the apparatus.

It has been attempted to provide two vibratory shafts of a dual axis structure are provided into a central portion of the vibration table so that the inner cylinder serves as an unbalanced shaft having a weight. The unbalanced shaft is provided with a helical cam groove and a control pin fitted to the helical cam groove so that the control pin is moved longitudinally to shift or change the phase of the weight to thereby obtain a predetermined vibration. This type of vibration mechanism, however, is still disadvantageous in that a sliding movement of the control pin relative to the helical cam groove is not as smooth as desired and it is likely that an undesirable displacement is generated, with the result that it has been difficult to obtain a predetermined, constant vibration to an entire area of the vibration table.

SUMMARY OF THE INVENTION

Accordingly, an object of the present invention is to provide a new variable amplitude type vibration apparatus which has a simple structure and which overcomes the disadvantages and difficulties inherent in the conventional apparatus described above.

Accordingly to the present invention, two pairs of two-vibration shaft (dual shaft) structures having an eccentric weight for producing vibration are arranged in a laterally symmetrical relation on the vibration table.

According to the present invention, there is provided a vibration apparatus for a variable amplitude type vibration table comprising:

a pair of vibration driving shafts disposed, in a parallel relation with each other, on a vibration table, each of the vibration driving shafts having an equivalent eccentric weight member, motors for separately and independently driving each of the vibration driving shafts disposed, a pair of vibration driven (follower) shafts, in a parallel relation with the vibration driving shafts, each having an equivalent eccentric weight, the eccentric weights of the vibration driven shafts being variable in phase relative to the eccentric weights of the vibration driving shafts, geared pulleys disposed to an end of each of the vibration driven shafts, timing belts engaged with the geared pulleys of an end of each of the vibration driving shafts through geared pulleys disposed on opposite ends of oscillating support arms, thereby forming a symmetrical reversing rotational transmission mechanism, an interlocking link mechanism, driven by a single cylinder device and coupled with a pivotal axis of the oscillating support arms of a symmetrical configuration, wherein a vertical vibration of the vibration table is solely varied between a minimum point to a maximum point in accordance with an extended length of a cylinder rod of the cylinder device.

In the structure described above, the interlocking link mechanism is arranged such that a pivotal axis of one of the oscillating support arms is located on the way of a crank portion coupled with an end of the cylinder rod and that an end of a connecting rod coupled with an end of the crank portion is located on a pivotal axis of the other of the oscillating support arms. The cylinder rod is extendable during the vibration of the vibration table to provide a continuous variability in amplitude of the vibration.

In the present invention, the vibration apparatus has two vibration driving shafts with equivalent eccentric weights and two additional vibration driven (follower) shafts with equivalent eccentric weights which are changeable in the phase thereof relative to the eccentric weights of the vibration driving shafts, so that the vibration driven shafts are rotatable in an opposite direction relative to the rotation of the vibration driving shafts through timing belts, in a symmetrical relation. Further, a change in phase of the weights of the vibration driven shafts is proceeded by a single cylinder in a stepless manner through the interlocking link mechanism. Thus, two pairs of the vibration driving/driven shafts, each having an equivalent eccentric weight, are provided in a symmetrical configuration as a whole and, therefore, vibration variety of the vibration table depends upon selection of the phase of the eccentric weights of both sides of the driving and driven shafts, so that a vertical vibration is generated in the range between a maximum level and a minimum level.

In other words, according to the present invention, in a case that the position (i.e., a phase) of the eccentric weights of each of the vibration driven (follower) shafts are set to be vertically symmetrical to the equivalent eccentric weights of each of the vibration driving shafts, the eccentric weights of the vibration driving shafts are positioned in a vertical (or up and down), symmetrical relation with respect to the eccentric weights of the vibration driven (follower) shafts and, therefore, vibrations in the vertical direction are offset or cancelled with each other to thereby provide a minimum amplitude. By contrast, a vibration in the horizontal (or, lateral) direction is offset or cancelled with each other to become zero (0) since the two pairs of the vibration driving shafts and vibration driven shafts are located in a symmetrical relation with each other.

If the position (phase) of the eccentric weights of each of the vibration driven shafts is set to be the same positional relation with respect to the position (phase) of the eccentric weights of each of the vibration driving shafts, a maximum amplitude in the vertical direction is obtained. In all of the phases from the minimum amplitude to the maximum amplitude, the vibration in the horizontal direction becomes offset or cancelled with each other, because the eccentric weights of the vibration driving shafts and the eccentric weights of the vibration driven shafts, two pairs in all, are laterally symmetrical and equivalent with each other.

In the vibration table described above, the vibration in the vertical direction is continuously varied from the maximum level to a minimum (stop) level by the shift of the position of the eccentric weights of the vibration driven shafts. However, with respect to the vibration in the horizontal direction, the entire positional relation (that is, a laterally symmetrical relation) is unchanged even if the position of the eccentric weights is changed and thus the horizontal vibrations are offset or cancelled with each other so that, as a consequence, only a vertical vibration is solely generated, because the paired vibration driven shafts each having an eccentric weight and the paired vibration driving shafts each having an eccentric weight are positioned in a laterally symmetrical relation relative to a center of the vibration table.

BRIEF DESCRIPTION OF THE DRAWINGS

FIGS. 6(A), 6(B) and 6(C) are diagrams showing positional relations of the eccentric weights of the vibration driving shafts and the eccentric weights of the vibration driven shafts, in which FIG. 6(A) shows a case that the eccentric weights of the both driving and driven shafts are positioned to be in a vertically symmetrical relation so that a vertical amplitude is minimum, FIG. 6(B) shows a case that the equivalent eccentric weights of the vibration driven shafts are displaced at 90° relative to the eccentric weights of the vibration driving shafts so that a vertical amplitude is of a medium level, and FIG. 6(C) shows a case that the equivalent eccentric weights of the vibration driving shafts and the eccentric weights of the vibration driven shafts are set to be positioned at the lowest position so that a vertical vibration is maximum.

DETAILED DESCRIPTION OF THE PREFERRED EMBODIMENT

Figure 1:
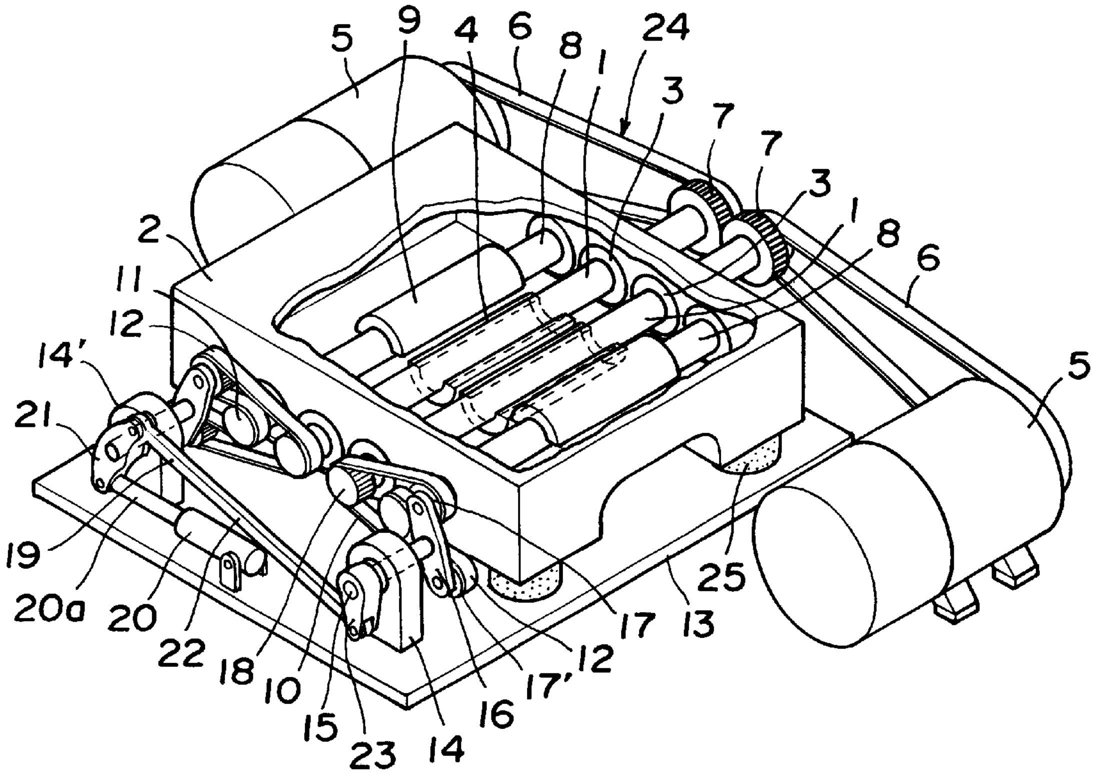
FIG. 1 is a sectional view of a vibration apparatus for a variable amplitude type vibration table according to an embodiment of the invention, showing a principal portion of the apparatus.

FIGS. 1 to 6 show an embodiment of the invention in which vibration shafts have eccentric weights on one surface of a longitudinal direction of the rotation shaft. In the illustrations, vibration driving shafts 1 have a pair of equivalent eccentric weights 4 which are supported in laterally parallel with each other by bearings 3 relative to a center of a predetermined vibration table 2. The vibration driving shafts 1 are driven by means of separate motors 5 and belts 6, and have synchronous gears 7 connected to one end of each of the shafts 1 such that the gears 7 are engaged with each other as shown in FIG. 1 to provide a synchronous rotation.

Vibration driven (i.e., follower) shafts 8, which are located outside the vibration driving shafts 1 in parallel relation, have equivalent eccentric weights 9. An eccentricity of the eccentric weights 9 is determined such that a suitable position or phase can be obtained by a rotation of the vibration driven shafts 8 themselves, relative to the equivalent eccentric weights 4 of the vibration driving shafts 1. A rotation of the vibration driven shafts 8 is a reversed one relative to, and driven by, the vibration driving shafts 1 through a suitable transmission mechanism which is shown by reference numeral 10. The reversal rotation transmission mechanism 10, 10 each has a geared pulley 11 fitted to an end of the vibration driven shaft 8, and an endless timing belt 12 of a duplex (double-face) type which is engaged with the geared pulley 11. The timing belt 12 is also engaged with geared pulleys 17, 17' of an oscillating support arm 16 which is integral with an supporting axis 16 supported by a bearing 14 of the machine body 13 so that a reversal rotation is attained. Further, the timing belt 12 is engaged with a geared pulley 18 which has the same number of gears as that of the aforementioned geared pulley 11 as illustrated in FIG. 1 so that the vibration driven shaft 8 is rotated in the opposite direction relative to the rotational direction of the vibration driving shaft 1.

An interlocking mechanism 19 drives the reciprocating support arms 16, 16 in a symmetrical configuration and has a crank structure in which a rod axis 20*a* of a single cylinder 20 is coupled with a lower end of a crank portion 21 which has a pivotal axis 15 at a center and is supported by the bearing 14' on the side of the machine body 13. An end of a connection rod 22 coupled with an upper end of the crank portion 21 is coupled with a lower end of a reciprocating lever 23 which is provided to a pivotal axis 15 journaled by the other bearing 14. These elements and parts of the apparatus described above constitute the vibration apparatus 24 for a variable amplitude type vibration table 2. In the figure of the drawing, reference numeral 25 represents a buffer device mounted between the machine body 13 and the vibration table 2.

Figure 7:
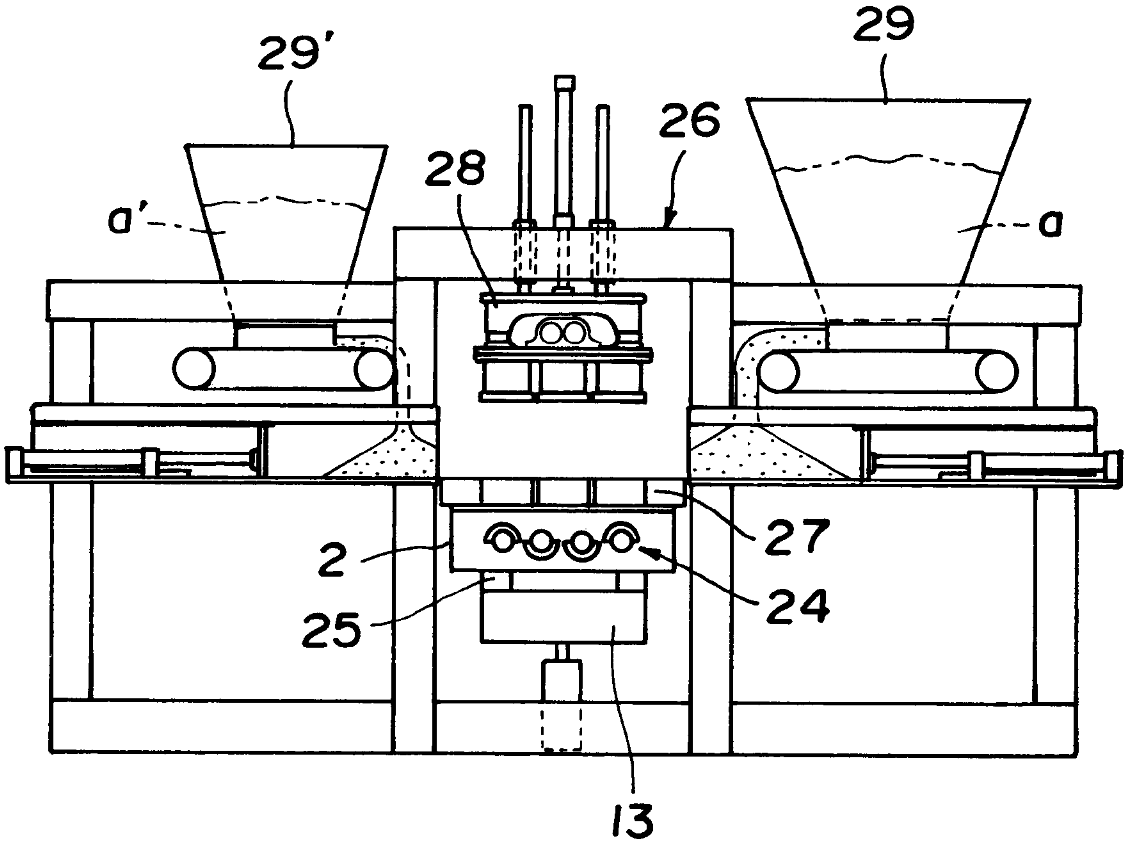
FIG. 7 is an explanatory view of the vibration apparatus for a variable amplitude type vibration table, which is adapted to a vibration table for a concrete block molding machine.

An operation will be explained with reference to FIG. 7 showing the case that the vibration apparatus 24 of the invention is incorporated into a concrete block molding machine 26. In the illustrated embodiment, the vibration apparatus 24 is mounted on a vibration table 2 which has thereon a mold form 27 for a concrete block. Above the table 2 is provided a stamp-press portion 28 and hopper portions 29, 29' for supplying two kinds of materials to the opposite sides of the mold form.

In molding of a concrete block by the apparatus shown in FIG. 7, block materials a, a' supplied from the hoppers 29, 29' are filled in the mold form 27 and the stamp-press portion 28 is lowered as a predetermined vibration is added to the vibration table 2 to thereby form a concrete block.

The vibration generated by the vibration table 2 is varied in the range between a maximum amplitude and a minimum amplitude by selection of a phase (position) of the eccentric weights 4 of the vibration driving shafts 1 and the other eccentric weights 9 of the vibration driven shafts 8 by the following reasons. Namely, among the four vibration shafts (that is, two pairs of the driving and driven shafts 1 and 8), the equivalent eccentric weights 4 of the two vibration driving shafts 1 are located at the same position, but the position (phase) of the eccentric weights 9 of the vibration driven shafts 8 which are parallel with the vibration driving shafts 1 is variable, by the effect of the reversal rotational transmission mechanism 10 and the interlocking mechanism 19, in the range from the same position to a symmetrical position which is displaced at 180° relative to the position of the eccentric weights 4. Thus, by the selection of the phase of the both weights 4 and 9, a vibration in the range between the maximum amplitude and the minimum amplitude is obtained.

Figure 3:
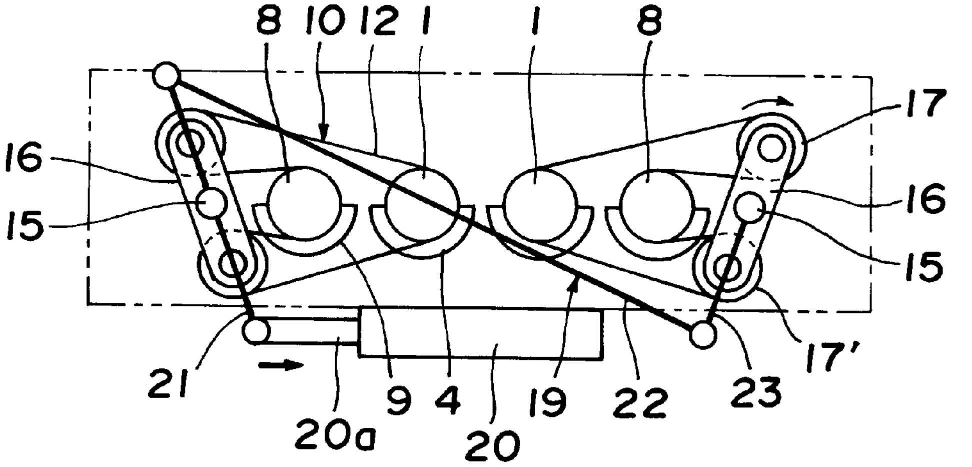
FIG. 3 is a side view of the vibration apparatus shown in FIG. 1 wherein an amplitude of the vertical vibration is maximum whereas a vibration in the horizontal direction is zero (0).
Figure 4:
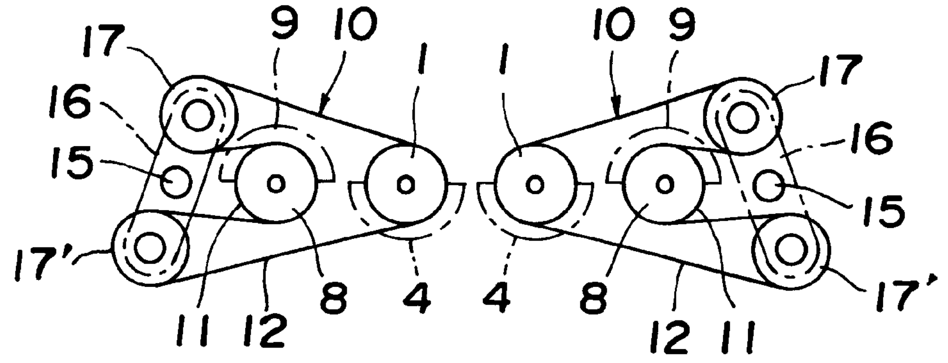
FIG. 4 is an explanatory diagram of a reversal rotation transmission mechanism in which an axial position of vibration driven shafts is variable.
Figure 5:
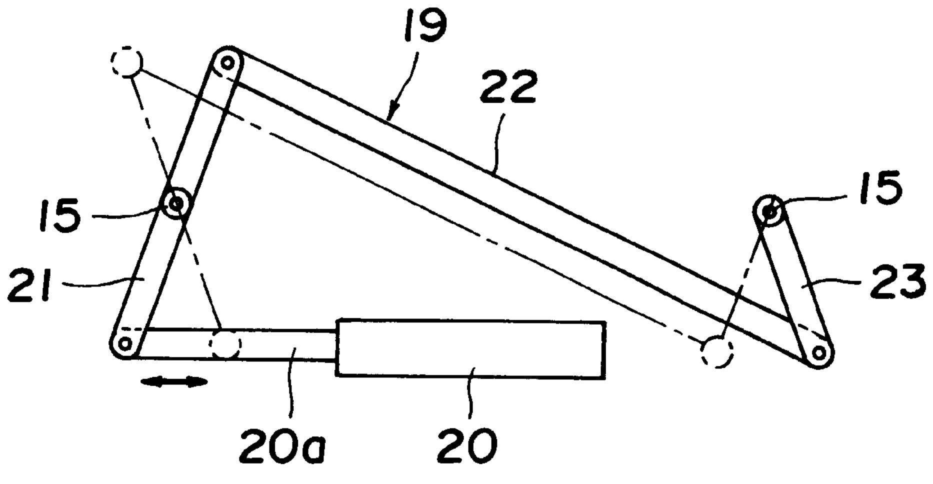
FIG. 5 is an explanatory diagram of an interlocking mechanism for interlocking or coupling with the reversal rotation transmission mechanism.
Figure 6:
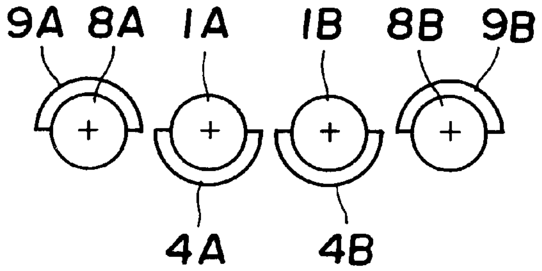
Figure 6:
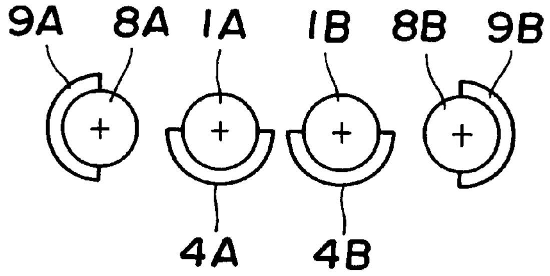
Figure 6:
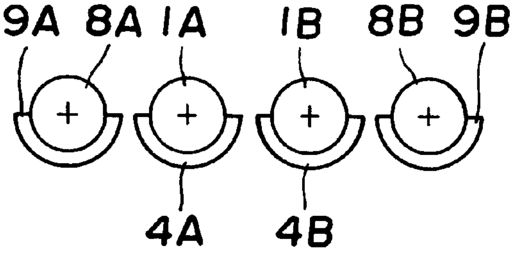

For example, when the eccentric position of the eccentric weights 4 of the two vibration driving shafts 1 is the same as the eccentric position of the eccentric weights 9 of the vibration driven shafts 8 as illustrated in FIGS. 3 and 6(C), a vibration in the vertical direction is amplified to generate a vertical vibration of a maximum amplitude. At this moment, the two pairs of vibration driving shafts 1 and the vibration driven shafts 8 are positioned in a symmetrical relation relative to a center of the table and, therefore, the vibrations of the two positions are offset or cancelled with each other to provide a zero (0) horizontal vibration.

When a vertical vibration of the vibration table 2 is to be changed according to the manufacturing steps such as supplying of material and compression, etc., a height of molded product, nature of the materials (heavy or light aggregates) to be used and so forth, it will be satisfactory to displace the phase or position between the eccentric weights 4 and 9 for a predetermined angular degree from the state of the vibration driving shafts 1 and the vibration driven shafts 8. In an operation of the eccentric weights 9, the cylinder 20 is first actuated to extend its rod 20*a* so that the crank portion 21 at an end of the rod 20*a* is laterally rotated at a pivotal axis 15 and, therefore, the connecting rod 22 at the end of the crank portion 21 is actuated to rotate the oscillating lever 23 on the side of the vibration driven shafts 8, and the oscillating support arm 16 is actuated through a pivotal axis 15 which is integral with the oscillating lever 23.

Figure 2:
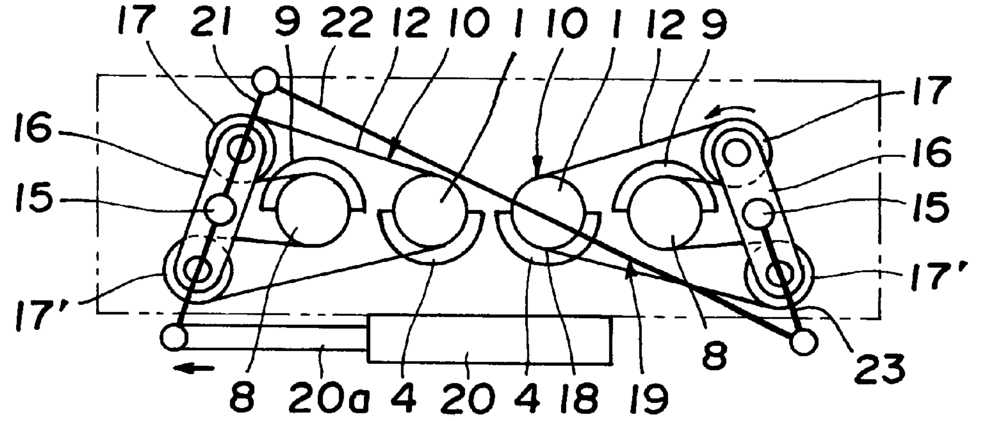
FIG. 2 is a side view of the vibration apparatus shown in FIG. 1 wherein an amplitude of the vibrations in the both vertical and horizontal directions is minimum.

If the cylinder rod 20*a* is extended to a maximum length, the opposing oscillating support arms 16, 16 are located in an inverted, bottomless V-shaped configuration as shown in FIG. 2 by the rotation of the pivotal axis 15, 15. At this moment, one of the geared pulleys 17, 17' of the upper and lower end of the oscillating support arms 16, that is, the upper geared pulley 17 is moved toward the geared pulley 11 of the vibration driven shafts 8, whereas the lower geared pulley 17' is moved apart from the geared pulley 11. Therefore, as the movement of the timing belts 12, the right-sided vibration driven shafts 8 in the illustration of FIG. 2 is rotated in a counter-clockwise direction and the left-sided vibration driven shaft 8 in the same illustration is rotated in the clockwise direction, provided that the vibration driving shafts 1 are considered to be fixed, and the eccentric weights 9 of the vibration driven shafts 8 are placed into a symmetrical position which is 180° rotated relative to the eccentric weights 4 of the vibration driving shafts 1.

As described above, when the eccentric weights 9 of the vibration driven shafts 8 and the eccentric weights 4 of the vibration driving shafts 1 are placed into a vertically symmetrical position, the vibrations generated by the driving and driven shafts 1, 8 are offset or cancelled with each other. Namely, in this state the amplitude of the vertical vibration is minimum. It will be understood that the horizontal vibrations as well are offset or cancelled with each other because the two pairs of the driving and driven shafts 1, 8 are positioned in a laterally symmetrical relation and, in other words, a vibration in the horizontal direction becomes zero Further, provided that the length of the rod 20*a* is extended to some point between a maximum extension and a minimum extension, the eccentric weights 9 of the vibration driven shafts 8 are displaced in phase relative to the eccentric weights 4 of the vibration driving shafts 1, and a vertical amplitude of maximum, minimum and middle scales will be obtained. In this state, a horizontal vibration is basically zero (0) and, in other words, the vibration table 2 of the kind described above generates only a vertical vibration. For example, if an extending operation of the rod 20*a* is stopped at some middle position so that the extended length of the rod 20*a* is of middle scale, the eccentric weights 9 of the vibration driven shafts 8 are displaced at 90° relative to the eccentric weights 4 of the vibration driving shafts 1 and, therefore, an amplitude of the vertical vibration is of some point between the maximum level and the minimum level of amplitude.

The principle of this vibration w ill be explained with reference to FIGS. 6(A) to 6(C). As shown in FIG. 6(A), two pairs of vibration driving shafts 1A, 1B having equivalent eccentric weights and vibration driven shafts 8A, 8B having eccentric weights are arranged in a symmetrical relation on the vibration table, and the eccentric weights 4A, 4B are positioned at the same lower place and the positions of the eccentric weights 9A, 9B of the outer vibration driven shafts 8A, 8B are shifted for 180° relative to the position of the eccentric weights 4A, 4B as illustrated. In this state, since the position of the eccentric weights 4A, 4B of the vibration driving shafts 1A, 1B is in an opposed and symmetrical relation with respect to the position of the eccentric weights 9A, 9B of the vibration driven shafts 8*a*, 8B, the both vibrations of the vibration driving shafts 1A, 1B and the vibration driven shafts 8A, 8B are offset or cancelled with each other and, consequently, an amplitude in the vertical direction becomes minimum. At this moment, with respect to a horizontal vibration, the eccentric weights 4A, 4B and 9A, 9B are arranged in a laterally symmetrical and equivalent relation from an entire viewpoint. Thus, a lateral vibrations are offset or cancelled with each other and a horizontal vibration becomes zero (0).

FIG. 6(C) shows a case in which the eccentric weights 4A, 4B of the vibration driving shafts 1A, 1B and the eccentric weights 9A, 9B of the vibration driven shafts 8A, 8B are positioned at the same lower position. In this state, when of the vibration driving shafts 1A, 1B and the vibration driven shafts 8A, 8B are rotated, the vibrations of these elements are amplified to thereby provide a maximum amplitude in the vertical direction. At this moment, the vibrations in the lateral direction are offset or cancelled with each other because of the laterally symmetrical positional relation, as similar as the case described above, and therefore a horizontal vibration also becomes zero (0).

FIG. 6(B) shows a case in which the eccentric weights 9A, 9B are positioned intermediate in the previous cases described above and, in other words, a position of the eccentric weights 9A, 9B of the vibration driven shafts 8A, 8B is shifted in phase by 90°, relative to the position of the eccentric weights 4A, 4B of the vibration driving shafts 9A, 9B, a vertical amplitude becomes intermediate between the maximum amplitude of the case FIG. 6(C) and the minimum amplitude of the case FIG. 6(A). This means that selection of the position of the eccentric weights 9A, 9B permits to obtain a desired value of the vertical vibration of the table from the maximum value to the minimum value.

According to the present invention, the vibration apparatus has a pair of synchronously operated vibration driving shafts 1 having eccentric weights 4 and a pair of vibration driven shafts 8 having eccentric weights 9 which can be changed or are variable in phase relative to the eccentric weights 4 of the vibration driving shafts 1 in such a manner that the vibration driven shafts 8 are driven in a reversal direction relative to a rotation of the vibration driving shafts 1 by means of timing belts 12 through pulleys disposed between upper and lower ends of the oscillating support arms 16. The oscillating support arms 16 are coupled with the interlocking link mechanism 19 which is driven by a single cylinder 20 and are oscillated, and the vibration driven shafts 8 are rotated by a displacement of the timing belts 12 in response to displacement or movement of the pulleys of the reciprocating support arms 16. By changing the position of the eccentric weights 9 of the vibration driven shafts 8 relative to the position of the eccentric weights 4 to provide a phase difference or displacement, an amplitude of a vertical vibration of the vibration table 2 can be varied and regulated in a stepless manner from a minimum point to a maximum point. Thus, desired vibrations in the vertical direction can be obtained in accordance with the use and purposes of the vibration table. According to the present invention, only a single cylinder permits to provide a variable amplitude in the vertical direction and, therefore, the amplitude can be regulated or adjusted at any desired time in accordance with size of the materials and/or molded products and steps of the manufacturing process.

Further, in the present invention, the reversal rotation mechanism and the interlocking link mechanism are driven by a single cylinder as described above and handling of change of the vibration is relatively easy and simple and the amplitude can be changed at any time during a vibration operation of the table. If the cylinder is disposed at an outer location relative to the vibration table, a change in vibration can be visually observed and, therefore, by a mere observation of an extended length of the cylinder rod permits an easy recognition of a vibration amplitude in the vertical direction.

If the vibration apparatus according to the present invention is applied to a vibration table for a concrete block molding machine, an immediate switching can be made to an optimal amplitude in accordance with conditions of supplying, filling and compressing steps, etc. so that a predetermined vibration can be obtained immediately. Thus, the vibration apparatus according to the present invention is suitable particularly to a case that vibration must be changed in response to the difference of materials for the products such as concrete blocks.

Further, in the present invention, two vibration driving shafts and two vibration driven shafts, four in all, are arranged in a simple and parallel configuration relative to the vibration table, an entire structure can be simplified so that assembly and maintenance of the apparatus can be made easily without substantial labour and difficulties.

What is claimed is:

1. A vibration apparatus comprising:

a vibration table having a central axis;

a pair of vibration driving shafts for vibrating the vibration table, the vibration driving shafts being mounted on the vibration table for undergoing rotation and being disposed symmetrically about the central axis thereof so that axes of the vibration driving shafts are parallel to one another;

a first pair of eccentric weights each mounted on a respective one of the vibration driving shafts;

a pair of motors each for separately and independently rotationally driving a respective one of the vibration driving shafts;

a pair of vibration driven shafts for vibrating the vibration table, the vibration driven shafts being mounted on the vibration table for undergoing rotation and being disposed symmetrically about the central axis thereof so that axes of the vibration driven shafts are parallel to one another and to the axes of the vibration driving shafts;

a pair of second eccentric weights each mounted on a respective one of the vibration driven shafts with a variable phase shift relative to the first eccentric weights;

a first rotation transmission mechanism for transmitting rotation of one of the vibration driving shafts to one of the vibration driven shafts, the first rotation transmission mechanism having a pair of first gears each connected to a respective end of said one vibration driving shaft and said one vibration driven shaft, a first support arm having a pair of second gears and mounted for undergoing pivotal movement about a first pivotal axis, and a first timing belt entrained around the first and second gears;

a second rotation transmission mechanism for transmitting rotation of the other of the vibration driving shafts to the other of the vibration driven shafts, the second rotation transmission mechanism having a pair of third gears each connected to a respective end of said other vibration driving shaft and said other vibration driven shaft, a second support arm having a pair of fourth gears and being mounted for undergoing pivotal movement about a second pivotal axis, and a second timing belt entrained around the third and fourth gears, the first and second pivotal axes being disposed symmetrically about the central axis of the vibration table;

an interlocking mechanism for interconnecting the first and second transmission mechanisms to one another and having a connecting rod having a first end connected to the first support arm for undergoing pivotal movement therewith about the first pivotal axis and a second end connected to the second support arm for undergoing pivotal movement therewith about the second pivotal axis; and a driving mechanism for driving the connecting rod of the interlocking mechanism to pivot the first and second support arms about the first and second pivotal axes, respectively, to thereby vibrate the vibration table, the driving mechanism having a tubular housing and a rod member having an end connected to the first end of the connecting rod and mounted to the tubular housing for undergoing extension and retraction movement relative to the tubular housing so that vertical vibration of the vibration table is varied between a maximum point and a minimum point solely in accordance with an extension length of the rod member relative to the tubular housing.

2. A vibration apparatus according to claim 1; further comprising means for extending and retracting the rod member of the driving mechanism during vibration of the vibration table to continuously vary the amplitude of the vibration.

3. A vibration apparatus according to claim 1; wherein the first and second transmission mechanisms transmit rotation of a respective one of the vibration driving shafts to a respective one of the vibration driven shafts to rotate the vibration driven shafts in a direction reverse to a rotation direction of the vibration driving shafts; and wherein the first and second eccentric weights undergo a variable phase shift during reciprocation of the first and second support arms by the driving mechanism about the first and second pivotal axes.

4. A vibration apparatus according to claim 1; wherein the vibration driving shafts and the vibration driven shafts lie in the same plane.

5. A vibration apparatus according to claim 1; wherein the first and second support arms are disposed symmetrically about the central axis of the vibration table.

6. A vibration apparatus according to claim 1; wherein the interlocking mechanism has a crank arm connected to the first support arm for undergoing pivotal movement about the first pivotal axis and a lever connected to the second support arm for undergoing pivotal movement about the second pivotal axis, the crank arm being connected to the first end of the connecting rod and the end of the rod member, and the lever being connected to the second end of the connecting rod.

7. A vibration apparatus comprising:

a vibration table having a central axis;

a plurality of vibration driving shafts for vibrating the vibration table, the vibration driving shafts being mounted on the vibration table for undergoing rotation and being disposed symmetrically about the central axis thereof so that axes of the vibration driving shafts are parallel to one another;

a plurality of motors each for separately and independently rotationally driving a respective one of the vibration driving shafts;

a plurality of eccentric weights each mounted on a respective one of the vibration driving shafts;

a plurality of vibration driven shafts for vibrating the vibration table, the vibration driven shafts being mounted on the vibration table for undergoing rotation and being disposed symmetrically about the central axis thereof so that axes of the vibration driven shafts are parallel to one another and to the axes of the vibration driving shafts;

a plurality of second eccentric weights each mounted on a respective one of the vibration driven shafts;

a plurality of rotation transmission mechanisms each for transmitting rotation of one of the vibration driving shafts to a respective one of the vibration driven shafts to rotate said respective one vibration driven shaft in a direction opposite to a direction of rotation of said one vibration driving shaft, each of the transmission mechanisms having a plurality of first gears each connected to an end of a respective one of the vibration driving shafts and the vibration driven shafts, a support arm having a plurality of second gears and mounted for undergoing pivotal movement about a pivotal axis, and a timing belt entrained around the first and second gears;

an interlocking mechanism for interconnecting the rotation transmission mechanisms to one another, the interlocking mechanism having a connecting rod having a first end connected to the support arm of one of the rotation transmission mechanisms for undergoing pivotal movement about the pivotal axis of the support arm of said one rotation transmission mechanism and a second end connected to the support arm of another of the rotation transmission mechanisms for undergoing pivotal movement about the pivotal axis of the support arm of said another rotation transmission mechanism; and driving means for driving the connecting rod of the interlocking mechanism to pivot the support arms of the rotation transmission mechanisms about the respective pivotal axis to thereby vibrate the vibration table.

8. A vibration apparatus according to claim 7; wherein the driving means comprises a tubular housing and a rod member having an end connected to the first end of the connecting rod and being mounted to the tubular housing for undergoing extension and retraction movement relative to the tubular housing so that vertical vibration of the vibration table is varied between a maximum point and a minimum point solely in accordance with an extension length of the rod member relative to the tubular housing.

9. A vibration apparatus according to claim 8; wherein the driving means includes means for extending and retracting the rod member during vibration of the vibration table to continuously vary the amplitude of the vibration.

10. A vibration apparatus according to claim 7; wherein the rotation transmission mechanisms are disposed symmetrically about the central axis of the vibration table.

11. A vibration apparatus according to claim 7; wherein the second eccentric weights are mounted on the vibration driven shafts with a variable phase shift relative to the first eccentric weights.

12. A vibration apparatus according to claim 7; wherein the vibration driving shafts and the vibration driven shafts lie in the same plane.

* * * * *